UNITED STATES PATENT OFFICE.

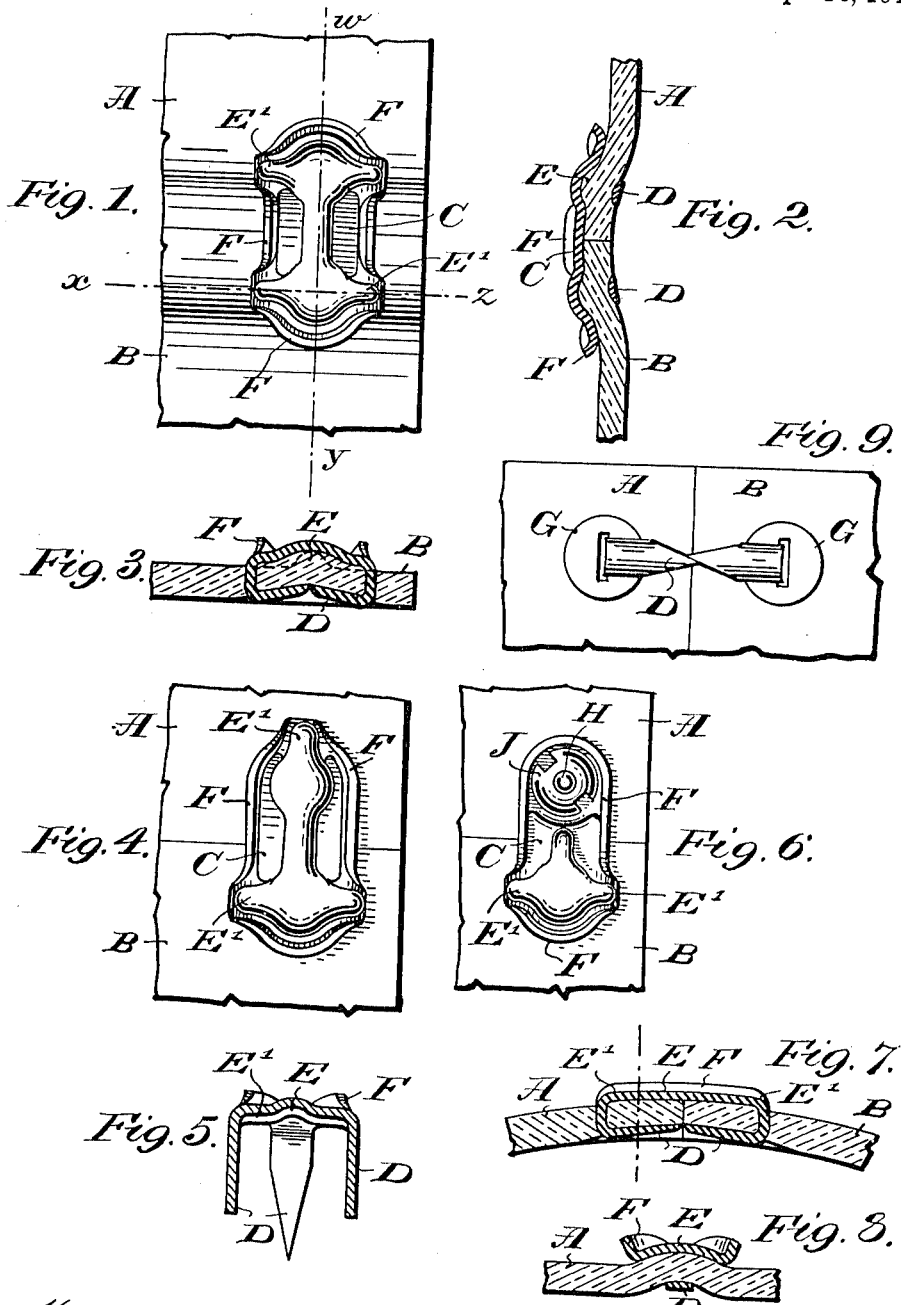

ISAAC JACKSON, OF GLOSSOP, ENGLAND.

BELT-FASTENER.

1,073,493. Specification of Letters Patent. Patented Sept. 16, 1913.

Application filed March 27, 1909. Serial No. 486,227.

*To all whom it may concern:*

Be it known that I, ISAAC JACKSON, a subject of the King of Great Britain and Ireland, and a resident of Glossop, in the county of Derby, England, have invented new and useful Improvements in Belt-Fasteners, of which the following is a specification.

This invention relates to fasteners for machine driving belts and to like fastening devices of that type in which teeth are formed upon or attached to a metal plate and are driven or passed through the substance of the belt and clenched over to secure the fastening plate in place upon the belt or belt ends.

In the accompanying drawings, Figure 1 is a face or plan view of one form of fastener, showing the same in place upon a belt; Fig. 2 is a sectional view on the line $w-y$ Fig. 1; Fig. 3 is a sectional view on the line $x-z$ Fig. 1; Fig. 4 is a plan view of a modified form of fastener; Fig. 5 is a sectional view of the fastener shown in Fig. 4; Fig. 6 is a plan view of another modification; Figs. 7 and 8 are longitudinal and transverse sectional views of a fastener having teeth of different cross sectional form from those shown in the other figures; Fig. 9 is an inner face view of a section of belt having another modified form of the fastener attached thereto.

The fastener illustrated in Figs. 1 to 3 is formed with four teeth one on each side at each end and the manner in which it is employed to make a joint upon the belt is apparent from the figures.

A and B are the belt ends which are to be joined together.

C is the plate fastener.

D are the teeth which are passed through the substance of the belt and clenched over to make a joint.

E E are the concavities, dome-like recesses, or equivalents formed to permit the displacement of the belt substance and the teeth D as illustrated in Fig. 3. As customarily made such recesses have not extended up to the roots of the teeth, and have joined such teeth in the plane of the plate and the teeth when clenched over have cut or broken the substance of the belt near to their roots. In the form of fastener shown in Figs. 1 to 3 constructed to embody my improvements the recesses E are provided with subsidiary grooves, recesses, or corrugations $E^1$, which extend from the main recesses right up to the roots of the teeth but are above the plane of the plate and will permit the displacement of all the belt substance which is under a tooth when it is clenched, instead of cutting or crushing it against an unrecessed portion of the inner face of the fastener.

In the modified form of fastener shown in Figs. 4 and 5 instead of having four teeth the plate only has three, one at one end of the fastener and two at the other. If preferred the single tooth at one end of the fastener may be longer than the teeth at the other end. The plate is similarly provided with subsidiary grooves recesses or the like $E^1$ extending up to the roots of the teeth, and along the normal plane of the plate.

In the fastener illustrated in Fig. 6 one end only of the plate is formed with teeth, the other end being formed for the reception or attachment of a removable fastening device such, for example, as a bolt H and a nut J. The teeth at the one end are similarly furnished or combined with corrugations $E^1$ running up to their roots.

It is evident from the drawings that the provision of the subsidiary corrugations $E^1$ will greatly stiffen and strengthen the parts of the plate where the teeth are attached.

The form of the fastener may be modified and still retain the improved features.

The edge of the fastener plate may be plain but the plate is preferred to provide it with an upturned marginal wall or flange or equivalent part or parts F to prevent the flattening of the domes E or $E^1$ during the act of putting or securing the fastener in place. Such a wall need not be continuous round the plate but may merge into the edges of the teeth D as clearly shown in Figs. 1, 4 and 6, and thus materially stiffen the teeth and their attachment to the plate. Such an upturned wall or marginal flange will give at its base rounded ends or sides to the fastener plate and will prevent cutting of the belt. When such a plate is turned with its upper face on an anvil or the like, it rests on the marginal flange or wall and the blows of a hammer clenching the teeth are taken by such wall or flange and there is no danger of the domes or equivalents being flattened out and thus preventing the proper displacement of the belt substance and the depression of the teeth below the driving surface of the belt.

The fastener may be cast or pressed or may be otherwise suitably formed and may have any convenient number of teeth at one end or side only or at both. When stamped, the teeth may be stamped out as lateral projections from and with the blank and then be bent down so as to project from the edge of the plate on one face. The plate is preferably slightly curved in the manner shown in Fig. 2 so as to approximate somewhat to the curvature of the pulleys with which it will be used.

The ends of the teeth may be oppositely chamfered or tapered so that when they are clenched their tips or ends will pass each other sideways to a slight extent.

The teeth D may themselves be corrugated or grooved or rounded on their inner faces as shown in Figs. 7 and 8 so that when they are clenched over the convex or rounded faces come against the substance of the belt and thus assist in more intimately fitting the displaced belt substance into the concavities or the like E or E¹ and do away with all danger of the teeth cutting the belt. Such a tooth may be simply rounded on its inner face.

Instead of the teeth being clenched down directly on to the surface of the belt they may first be passed through washers G and then be clenched down over the washers as shown in Fig. 9. These washers may be spiked on their inner faces to get a better grip of the surface of the belt. The washers G or any equivalent means placed about the teeth should be of such a nature or shape as to be depressed below the normal belt surface so as to permit the depression of the teeth.

No claim is herein made to a fastener provided with an upturned or outwardly projecting marginal flange, which extends beyond the outer surface of the dome or convex surface of the fastener plate, as the same is claimed in a co-pending application Serial No. 486,228, filed March 27, 1909.

I claim:—

A belt fastener comprising a metal plate provided with marginal teeth and having on its inner surface a main recess or cavity and subsidiary recesses extending from the main recess to the root of each tooth.

In witness whereof I have hereunto set my hand in the presence of two subscribing witnesses.

ISAAC JACKSON.

Witnesses:
WILLIAM GEO. HEYS,
JOHN O'CONNELL.

Copies of this patent may be obtained for five cents each, by addressing the "Commissioner of Patents, Washington, D. C."